United States Patent
Wang

(10) Patent No.: US 7,273,224 B2
(45) Date of Patent: Sep. 25, 2007

(54) TRAY DEVICE FOR STROLLER

(75) Inventor: Chih-Wei Wang, Taipei (TW)

(73) Assignee: Adora Business Company Limited, Road Town, Tortola (VG)

( * ) Notice: Subject to any disclaimer, the term of this patent is extended or adjusted under 35 U.S.C. 154(b) by 281 days.

(21) Appl. No.: 10/849,280

(22) Filed: May 19, 2004

(65) Prior Publication Data

US 2005/0258612 A1 Nov. 24, 2005

(51) Int. Cl.
*B62B 1/00* (2006.01)
(52) U.S. Cl. ........................ 280/647; 224/409
(58) Field of Classification Search ............. 280/47.38, 280/79.2, 642, 647, 650, 33.992; 248/222.11, 248/230.1; 224/409, 411
See application file for complete search history.

(56) References Cited

U.S. PATENT DOCUMENTS

| | | | | |
|---|---|---|---|---|
| 5,123,767 A * | 6/1992 | Ishikura et al. | ............... | 403/24 |
| 5,257,799 A * | 11/1993 | Cone et al. | ................. | 280/642 |
| 5,348,374 A * | 9/1994 | Kuo | ...................... | 297/344.18 |
| 5,816,648 A * | 10/1998 | Baccili et al. | ........... | 297/159.1 |
| 6,368,006 B1 * | 4/2002 | Yang et al. | .................... | 403/84 |
| 6,478,503 B1 * | 11/2002 | Cheng | ..................... | 403/322.4 |
| 6,520,463 B1 * | 2/2003 | Ouano | ................... | 248/222.13 |
| 6,698,773 B2 * | 3/2004 | Hsia | ........................ | 280/47.38 |
| 6,877,801 B2 * | 4/2005 | Asbach et al. | ............. | 297/16.1 |
| 7,017,922 B2 * | 3/2006 | Hartenstine et al. | ..... | 280/47.38 |

* cited by examiner

*Primary Examiner*—Frank Vanaman
(74) *Attorney, Agent, or Firm*—Scully, Scott, Murphy & Presser, P.C.

(57) ABSTRACT

A tray device for a stroller comprises a tray body as well as, at each end of both ends of the tray body, a slider movable relative to the tray body, an operating unit for pushing away the slider, and an elastic member for pushing back the slider. When the operating units both are executed, the stakes of the sliders are respectively escaped from two armrests to enable the tray device being detached from the armrests. If only one operating unit is actuated, the tray device can be turned over.

8 Claims, 5 Drawing Sheets

TRAY DEVICE FOR STROLLER

FIELD OF THE INVENTION

The present invention relates generally to a tray device for a stroller, and more particularly to a tray device which is rotatable or detachable by press operation.

BACKGROUND OF THE INVENTION

A conventional tray accessory 8 for a stroller shown in FIG. 1 is disclosed in U.S. 2002/0175498 A1 laid-open patent application. One end of the tray accessory 8 is pivotally connected to a first handrail 82 of the stroller by a pin 81 and another end with a latch 83 is engaged into a recess 85 in a second handrail 84 of the stroller, whereby the conventional tray accessory 8 is connected to (the handrails of) the stroller.

In order to conveniently take the baby from and put the baby into the stroller, a tab 86 is pulled open to the extent that the latch 83 is slightly released from the recess 85 and then the end of the tray accessory 8 on the second handrail 84 is lifted so as to leave the tray accessory 8 hung on the first handrail 82 at another end and to form an opening between the first handrail 82 and the second handrail 84.

However, the latch 83 of the conventional tray accessory 8 is inclined to be worn out after repeatedly engaging and disengaging, which results in infirm connection between the tray accessory 8 and the second handrail 84. Therefore, due to the baby's playing with and shaking, the tray accessory 8 may accidentally escape from the second handrail 84 to make the baby riskily fall down from the stroller.

SUMMARY OF THE INVENTION

Accordingly, the present invention relates to a tray device for a stroller that can substantially obviate one or more of the problems due to the limitations and disadvantages of the related arts.

One object of the present invention is the provision of a rotatable and detachable tray device for a stroller wherein the connection between the tray device and the stroller is firm and safe.

Additional features and advantages of the invention will be set forth in the description which follows, and in portion will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, a tray device for being connected to a frame unit of a stroller comprises: a tray body having a first guider and a second guider; a slider having a first groove, the first guider being received in the first groove; an operating unit having a coupling piece and a second groove, the second guider being received in the second groove and the coupling piece substantially contacting with the slider; an elastic member having two opposed ends, one end contacting with the slider, another end contacting with the tray body; wherein when the operating unit is not actuated, the slider is situated at a first position and engaged with the frame unit so as to connect the tray device and the frame unit together; when the operating unit is actuated, the slider is moved to a second position and escaped from the frame unit so as to separate the tray device and the frame unit.

It is preferred that the frame unit has a neck portion for connecting with one end of the tray body.

It is preferred that the tray device has the slider, the operating unit and the elastic member respectively at each of two ends thereof; when the operating unit situated at either end of the tray device is actuated, the tray device can be rotated relative to the frame unit; when the operating units situated at both ends of the tray device are actuated, the tray device can be detached from the frame unit.

It is preferred that the slider has a stake and the frame unit has a hole, and thus the tray device and the frame unit can be connected together by the stake being received in the hole.

It is preferred that the first groove is situated at one end of the slider and the slider further has a third groove at another end thereof for receive a third guider of the tray device.

It is preferred that the another end of the elastic member contacts with the third guider.

It is preferred that the coupling piece of the operating unit is a tongue which contacts with a rib of the slider.

It is preferred that the tray device further has a cover for at least shield partially the slider and the operating unit.

It is preferred that the tray body has an aperture and the operating unit has a head portion which is received in the aperture and at least partially protrudes out of the tray body.

It is to be understood that both the forgoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a portion of the specification, illustrate embodiments of the invention and together with the description serve to explain the principle of the invention. In the drawings.

DETAILED DESCRIPTION OF THE INVENTION

The present invention is adapted to be utilized not only in a stroller, but also in the apparatuses for babies' and children's riding, sitting and lying, such as a high chair or a swinging chair etc.

Figure 1:
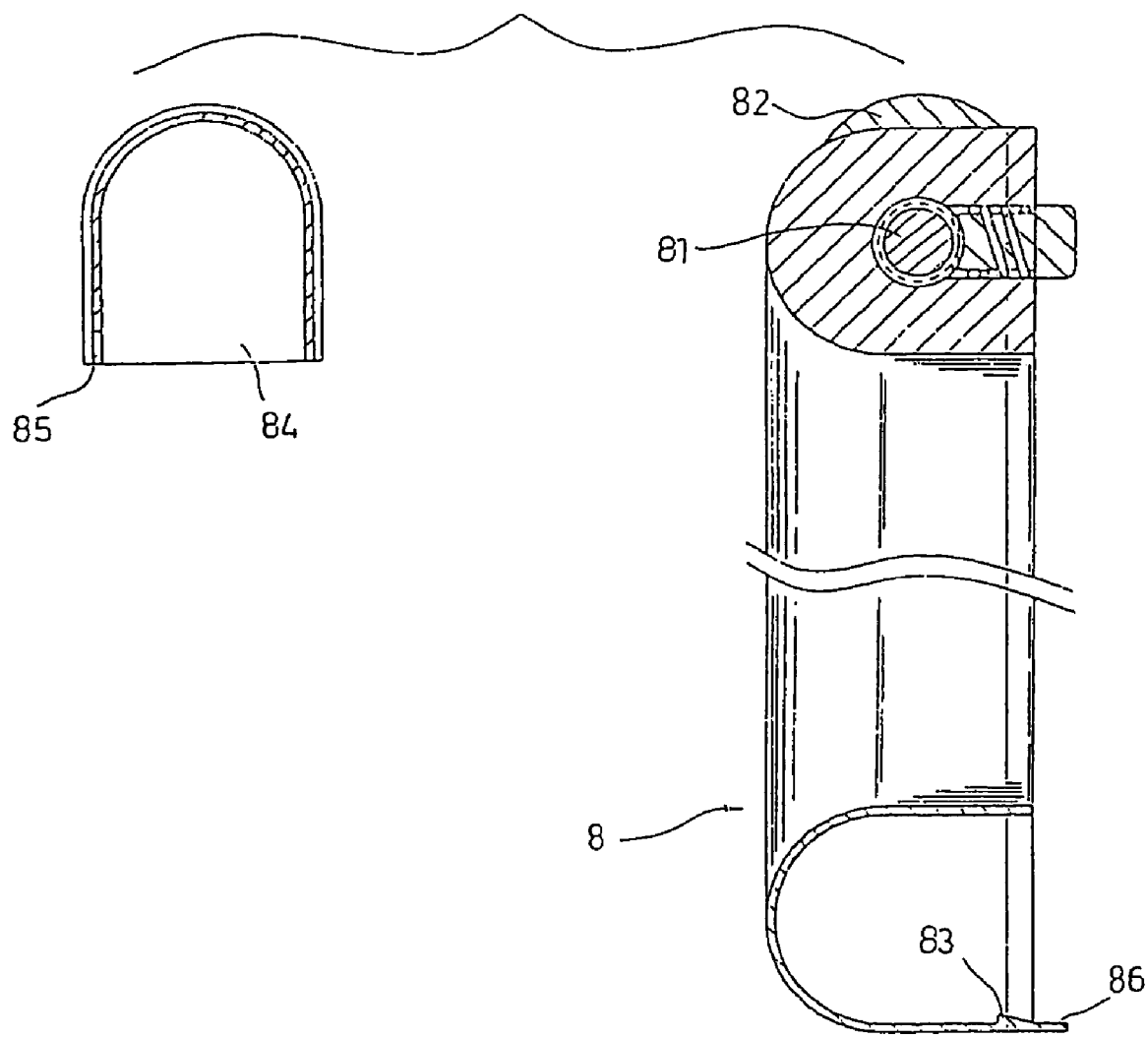
FIG. 1 is a front plane view of a conventional tray accessory illustrating a post-rotated state.
Figure 2:
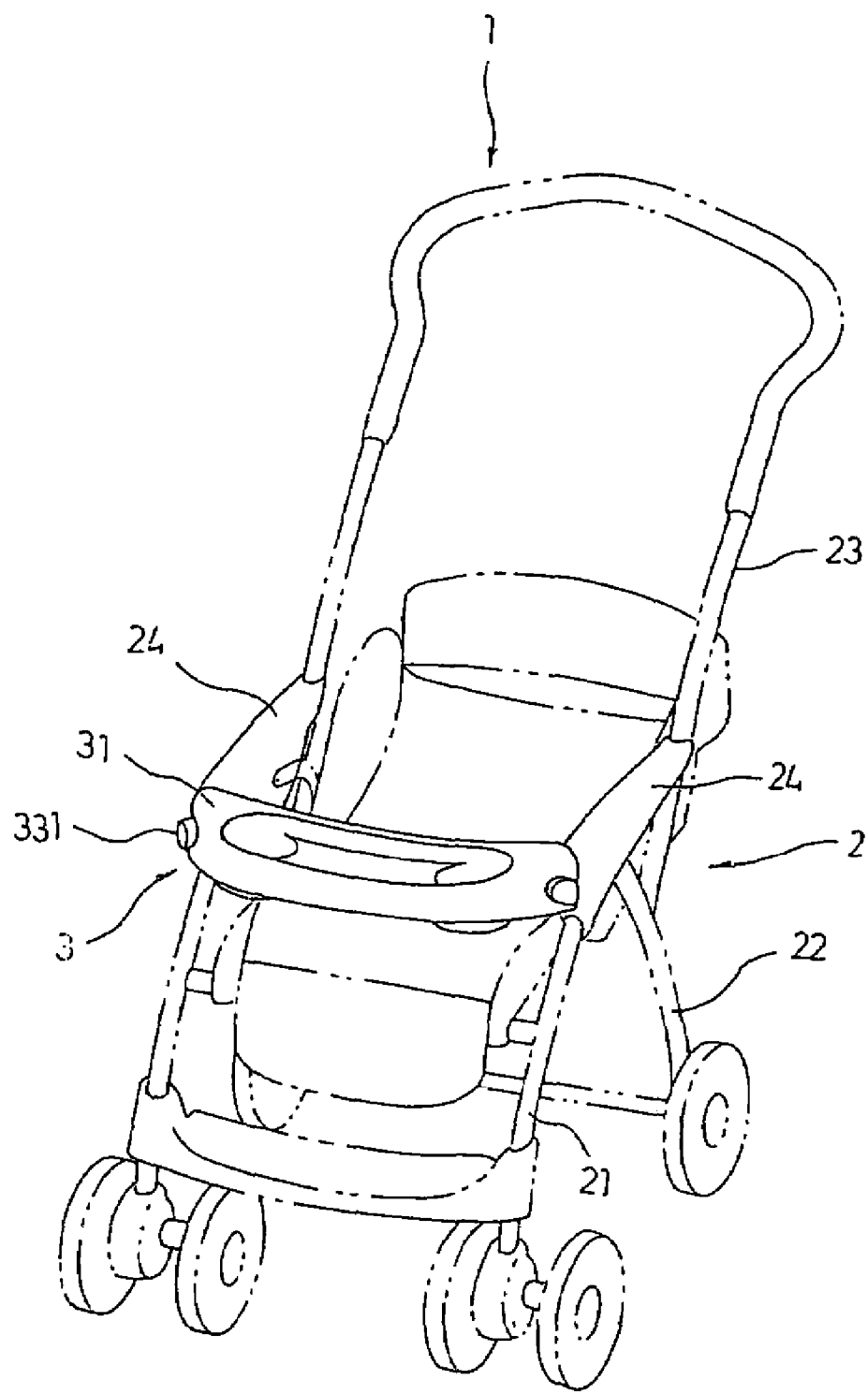
FIG. 2 is a perspective view of the tray device mounted to a stroller according to the present invention.
Figure 3:
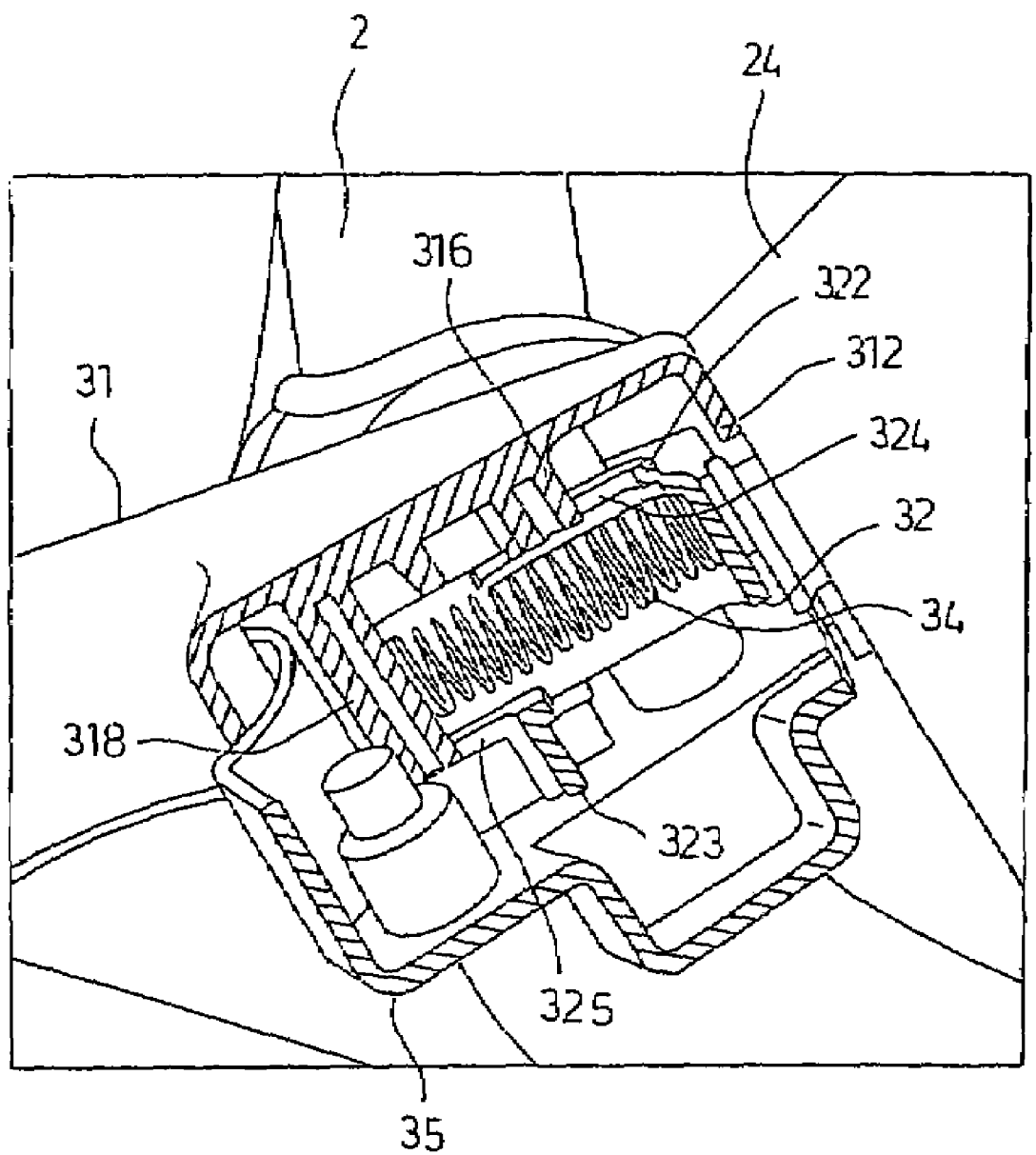
FIG. 3 is a sectional perspective view around the joint of the tray device and an armrest of the stroller according to the present invention.
Figure 7:
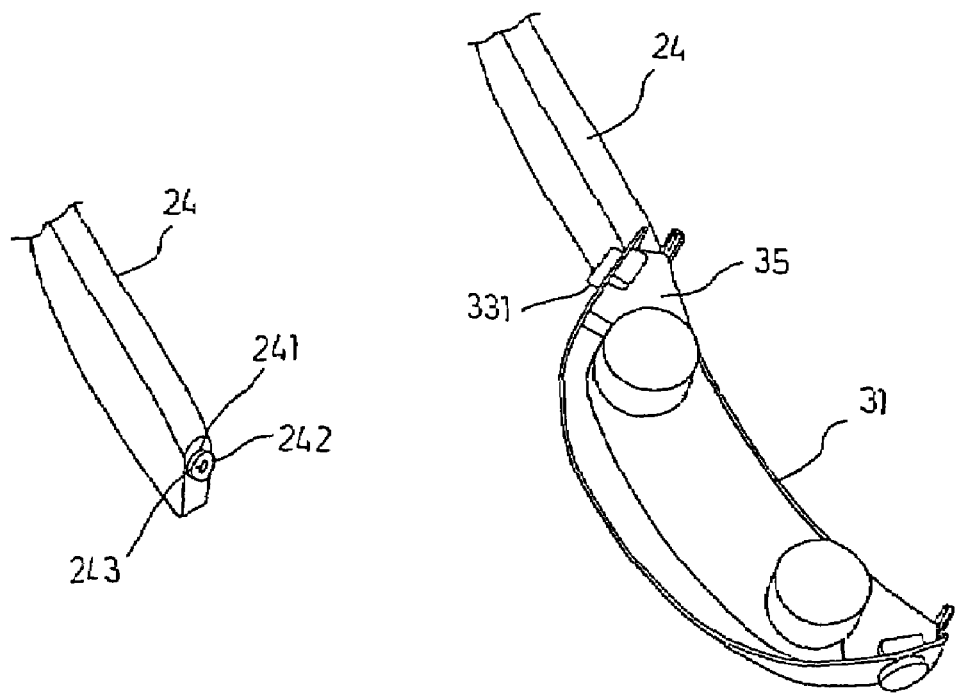
FIG. 7 is a perspective view according to the present invention showing that the tray device is engaged with only one armrest but is separated with another armrest.

As shown in FIG. 2, a stroller 1 according to the present invention comprises a frame unit 2 and a tray device 3. The frame unit 2 further includes a front lower bar group 21, a rear lower bar group 22, a rear upper bar group 23 and two, left and right, armrests 24, all of which are pivotally connected together. As shown in FIG. 7, each armrest 24, at front end thereof, has a neck portion 241 with a smaller diameter, a ring portion 242 with a larger diameter, and a hole 243 formed at the centers of the neck portion 241 and the ring portion 242. The tray devices 3 of various type of the stroller 1 may be respectively mounted at the front lower bar group 21, the rear lower bar group 22, the rear upper bar group 23 or the armrests 24. The preferred embodiment hereinafter is illustrated about the case that the tray devices 3 is mounted at the armrests 24.

As shown in FIGS. 3 to 6, the tray device 3 includes a tray body 31, which in a plan view has generally the shape of a banana, a substantially U-shaped slider 32, an operating unit 33, an elastic member 34, and a cover 35.

The tray body 31 has a base 311 and a skirt 312 perpendicularly extending downwardly around the base 311. At each of two opposed ends of the tray body 31, the skirt 312 respectively has an U-shaped opening 314 and an aperture 315 substantially oriented forwardly. A first guider 316, a second guider 317, and a third guider 318 downwardly protrude, near each opening 314, from the base 311.

The slider 32 includes a stake 321 longitudinally extending outwardly from the U-shaped closed end thereof, an arc of flange 322 upwardly extending from the U-shaped closed end thereof, an U-shaped rib 323 downwardly extending from the open end thereof, a first groove 324 defined by the flange 322, and a third groove 325 defined by the rib 323.

The operating unit 33 includes a cylinder head portion 331 and a plate-shaped tail portion 332. The head portion 331 and the tail portion 332 may be integrally formed together, or be separately formed and then be assembled together. The tail portion 332 has a coupling piece 333, such as an inclined tongue, at the middle section thereof and a second groove 334 at the free end thereof.

Assembling of the Tray Device 3

First, the slider 32 is placed at the bottom surface of the base 311 of the tray body 31 and simultaneously the first guider 316 is accommodated in the first groove 324 as well as the third guider 318 is accommodated in the third groove 325. Next, the elastic member 34 is put into the hollow slider 32. One end of the elastic member 34 is abutted against the closed end of the slider 32 and another end of the elastic member 34 is abutted against the third guider 318. Then, the operating unit 33 is provided under the slider 32 and at the same time the head portion 331 is received in the aperture 315 as well as the second guider 317 is accommodated in the second groove 334. In this state, the coupling piece 333 substantially contacts with the rib 323 and the tail portion 332 can block the elastic member 34 from dropping out of the slider 32. Finally, the cover 35 is secured to the tray body 1 by screws (not shown) so as to shield the slider 32 and the operating unit 33 except the front part of the head portion 331, which is revealed outside of the skirt 312 of the tray body 31. As far as the positions for the screws, the centers of the second guider 317 and the third guider 318 may be included.

Operating of the Tray Device 3

Figure 4:
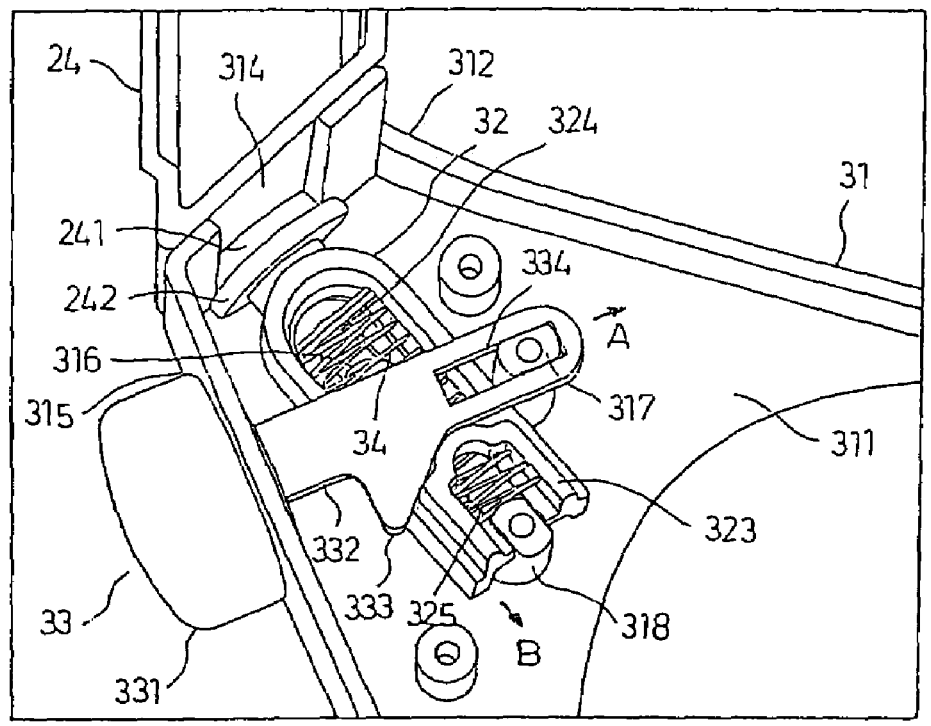
FIG. 4 is a bottom perspective view according to the present invention showing a state of the tray device engaged to the armrest without a cover.
Figure 5:
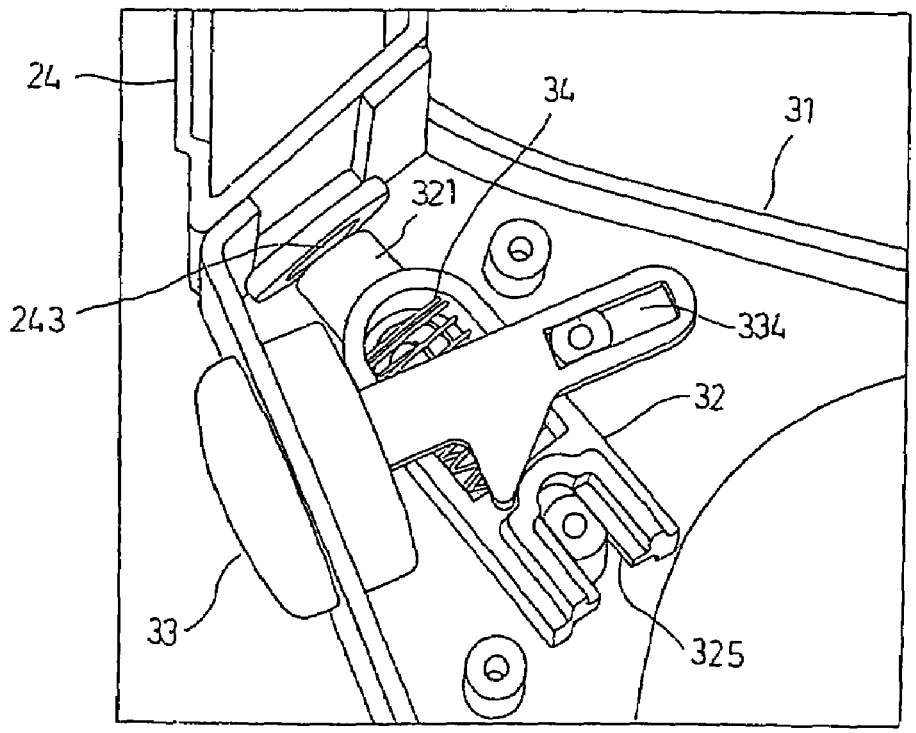
FIG. 5 is a bottom perspective view according to the present invention showing a state of the tray device detachable from the armrest without a cover.
Figure 6:
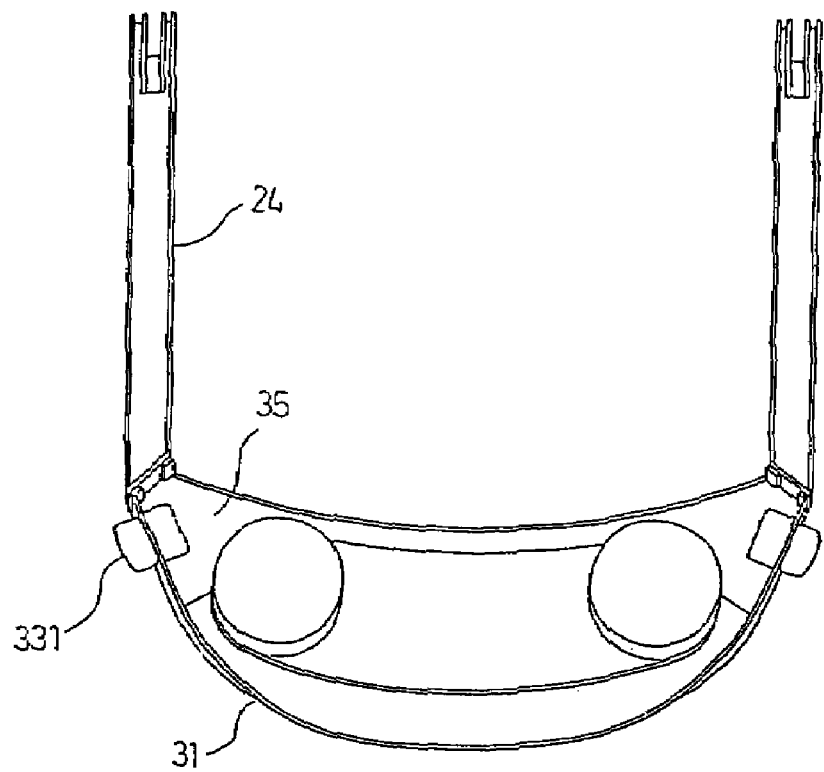
FIG. 6 is a bottom perspective view according to the present invention showing that the tray device is engaged with two armrests.

As shown in FIGS. 4 and 5, when the head portion 331 of the operating unit 33 is pressed, the operating unit 33 slides along the direction of the arrow A under the guidance of the second guider 317. Simultaneously, the rib 323 is pushed by the coupling piece 333 to actuate the slider 32 sliding along the direction of the arrow B under the guidance of the first guider 316 and the third guider 318, which results in the elastic member 34 is compressed. In this state, because the stake 321 has been moved along the direction of the arrow B, the tray body 31 can be installed to the armrest 24 by put the neck portion 241 of the armrest 24 into the U-shaped opening 314. Then, after the hand pressing the operating unit 33 is withdrawn, the slider 32 is moved by the restoration force of the elastic member 34 along the opposed direction of the arrow B to the extent that the stake 321 is inserted into the hole 243 of the armrest 24. In this situation, the tray device 3 is unable to escaped from the armrest 24 along the axial or radial direction of the stake 321 so that the tray device 3 can be firmly connected with the armrest 24. Also, the operating unit 33 is cooperated by the rib 323 and slides back along the opposed direction of the arrow A, as shown in FIG. 4.

As shown in FIG. 5, when it is desired to take the baby from or put it into the stroller 1, the head portion 331 of the operating unit 33 is pressed again to the extent that the stake 321 escapes from the hole 243 of the armrest 24. Then the tray device 3 is upwardly lifted to completely separate the end of the tray device 3 from the armrest 24. If this operation is executed at both ends of the tray device 3, the tray device 3 can be entirely detached from the armrest 24. Alternatively, if this operation is executed at only one end of the tray device 3, another end of the tray device 3 can by no means escape from the armrest 24 along the axial direction of the stake because the skirt 312 at this another end is blocked by the ring portion 242. Therefore, the tray device 3 can invert about 180 degrees as shown in FIG. 7 relative to the neck portion 241, which functions as a pivot, of the armrest 24 at this another end. Consequently, there is no member between two, left and right, armrests 24, which is convenient for taking baby from and put baby into the stroller 1.

Advantages

By pushing the stake 321 into the hole 243 of the armrest 24, the tray device 3 disclosed in the present invention can be firmly connected to the armrests 24. When the stake 321 escapes from the hole 243, there happens no wear. Therefore, even the operation of mounting and dismounting is repeated but there is no risk of wearing out the related elements. Since no wear may deteriorate the firm connection between the tray device 3 and the armrest 24, then the baby is secure against dropping from the stroller 1. Accordingly, the tray device 3 of the present invention is of great safety.

Other Embodiments

The first guider 316 and the third guider 318 above-mentioned can be combined to a new guider with proper length only if the new guider can maintain smooth movement and direction of the slider 32. Similarly, the first groove 324 and the third groove 325 above-mentioned can be combined to a new groove to match with the new guider.

This invention has been disclosed in terms of specific embodiments. It will be apparent that many modifications can be made to the disclosed structures without departing from the invention. Therefore, it is the intent of the appended claims to cover all such variations and modifications as come within the breadth and scope of this invention.

What is claimed is:

1. A tray device for being connected to a frame unit of a stroller, the tray device comprising:
   a tray body having a first guider and a second guider;
   a slider having a first groove, the first guider being received in the first groove;
   an operating unit having a coupling piece and a second groove, the second guider being received in the second groove and the coupling piece slidably contacting with the slider;
   an elastic member having two opposed ends, one end contacting with the slider, another end contacting with the tray body;
   wherein when the operating unit is not actuated, the slider is situated at a first position and engaged with the frame unit so as to connect the tray device and the frame unit together;
   when the operating unit is actuated, the slider is moved relative to the operating unit to a second position and disengaged with the frame unit so as to separate the tray device and the frame unit;
   wherein the first groove is situated at one end of the slider and the slider further has a third groove at another end thereof for receiving a third guider of the tray device; and
   wherein the tray device has the slider, the operating unit and the elastic member respectively at each of two ends thereof; when the operating unit situated at either end of the tray device is actuated, the tray device can be rotated relative to the frame unit: when the operating units situated at both ends of the tray device are actuated, the tray device can be detached from the frame unit.

2. The tray device for the stroller as claimed in claim 1, wherein the frame unit has a neck portion for connecting with one end of the tray body.

3. The tray device for the stroller as claimed in claim 2, wherein the slider has a stake and the frame unit has a hole, and thus the tray device and the frame unit can be connected together by the stake being received in the hole.

4. The tray device for the stroller as claimed in claim 1, wherein the slider has a stake and the frame unit has a hole, and thus the tray device and the frame unit can be connected together by the stake being received in the hole.

5. The tray device for the stroller as claimed in claim 1, wherein another end of the elastic member contacts with the third guider.

6. The tray device for the stroller as claimed in claim 1, wherein the coupling piece of the operating unit is a tongue which contacts with the rib of the slider.

7. The tray device for the stroller as claimed in claim 1, wherein the tray device further has a cover for at least shielding partially the slider and the operating unit.

8. The tray device for the stroller as claimed in claim 1, wherein the tray body has an aperture and the operating unit has a head portion which is received in the aperture and at least partially protrudes out of the tray body.

* * * * *